US011979288B2

United States Patent
Kurmala et al.

(10) Patent No.: US 11,979,288 B2
(45) Date of Patent: May 7, 2024

(54) SYSTEMS AND METHODS FOR ZERO TOUCH PROVISIONING (ZTP) OVER TRUNK/LACP PORTS

(71) Applicant: HEWLETT PACKARD ENTERPRISE DEVELOPMENT LP, Houston, TX (US)

(72) Inventors: Hari Krishna Kurmala, Santa Clara, CA (US); Prasanna Sridharan, Santa Clara, CA (US); Dhrumil Desai, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/244,902

(22) Filed: Apr. 29, 2021

(65) Prior Publication Data

US 2022/0353147 A1 Nov. 3, 2022

(51) Int. Cl.
*H04L 41/08* (2022.01)
*H04L 12/46* (2006.01)
(Continued)

(52) U.S. Cl.
CPC ...... *H04L 41/0886* (2013.01); *H04L 12/4695* (2013.01); *H04L 41/0816* (2013.01); *H04L 61/5014* (2022.05)

(58) Field of Classification Search
CPC ............. H04L 41/0886; H04L 12/4695; H04L 41/0816; H04L 61/5014
See application file for complete search history.

(56) References Cited

U.S. PATENT DOCUMENTS 7,702,732 B1 * 4/2010 Squire .................. G06F 15/177
709/219
10,282,346 B1 * 5/2019 Lue ........................ G06F 9/4401
(Continued)

FOREIGN PATENT DOCUMENTS

EP 3518493 A1 * 7/2019 ............. H04L 41/08

OTHER PUBLICATIONS

Ravindra Narayan et al., Automatic Trunk VLAN Discovery for Day-0 Switch Deployment, 2 pages, IP.com Prior Art Database Technical Disclosure, IPCOM000252900D, Cisco Systems. (Year: 2018).*

(Continued)

*Primary Examiner* — Patrice L Winder
(74) *Attorney, Agent, or Firm* — Sheppard Mullin Richter & Hampton LLP

(57) ABSTRACT

Systems are methods are described which allow for "zero-touch" provisioning (ZTP) to be used to seamlessly bring up devices such as Gateways/Access Points/Switches or any other networking devices connected over different uplink types such as aggregated links (Static LAG, LACP), trunk ports, and the like. Provisioning is adapted specifically for trunk and/or LACP ports in order to maintain the automation and optimization benefits typically provided by ZTP. A method can include transmitting a discover message, and receiving a response message based on the discover message. Then, determining whether a pre-defined extension is included in the response message that indicates a port type and a virtual local area network (VLAN) configuration. Automatic configuration of one or more ports and a VLAN can be performed as indicated by the pre-defined extension. Thus, ZTP can be restarted in accordance with the configuration of the network device.

12 Claims, 5 Drawing Sheets

(51) Int. Cl.
    *H04L 41/0816*     (2022.01)
    *H04L 61/5014*     (2022.01)

(56) References Cited

U.S. PATENT DOCUMENTS

| | | | | |
|---|---|---|---|---|
| 10,819,676 | B1* | 10/2020 | Kolanowski | H04L 61/5014 |
| 11,153,155 | B1* | 10/2021 | Perez | H04L 41/0809 |
| 2015/0319043 | A1* | 11/2015 | Dibirdi | H04L 41/0886 370/254 |
| 2017/0026335 | A1* | 1/2017 | Dhulipala | H04L 41/0806 |
| 2018/0034698 | A1* | 2/2018 | Perez | H04L 41/0886 |
| 2021/0152420 | A1* | 5/2021 | Sidhartha | H04L 63/08 |
| 2021/0184936 | A1* | 6/2021 | Mutnuru | H04L 45/02 |
| 2021/0211351 | A1* | 7/2021 | Lin | H04L 41/0886 |
| 2021/0255876 | A1* | 8/2021 | Puhan | G06F 9/45558 |
| 2022/0217052 | A1* | 7/2022 | Mutnuru | H04L 49/1515 |

OTHER PUBLICATIONS

Vinay Sharma, "Configuring DHCP Option 43 and Option 60," Nov. 18, 2020, Cisco Community, <https://community.cisco.com/t5/wireless-mobility-knowledge-base/configuring-dhcp-option-43-and-option-60/ta-p/3143572>.

* cited by examiner

SYSTEMS AND METHODS FOR ZERO TOUCH PROVISIONING (ZTP) OVER TRUNK/LACP PORTS

DESCRIPTION OF RELATED ART

Currently, cloud based services can be adapted for "Zero-Touch" provisioning (ZTP) of network devices and inventory management. Among its many advantages, ZTP technology eliminates the need for manual intervention during provisioning. For example, by employing ZTP, technical support personnel does not need to visit an installation site to provision a network device. Other advantages of ZTP technology include avoiding re-shipment of network devices after provisioning, and optimizing use of resources. A provisioning scheme that employs ZTP can enable networks, such as wireless local area networks (WLANs) and virtual local area networks (VLANS) to be deployed at unprecedented speed and without onsite Information Technology (IT) Support at any number of locations worldwide.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

Figure 1:
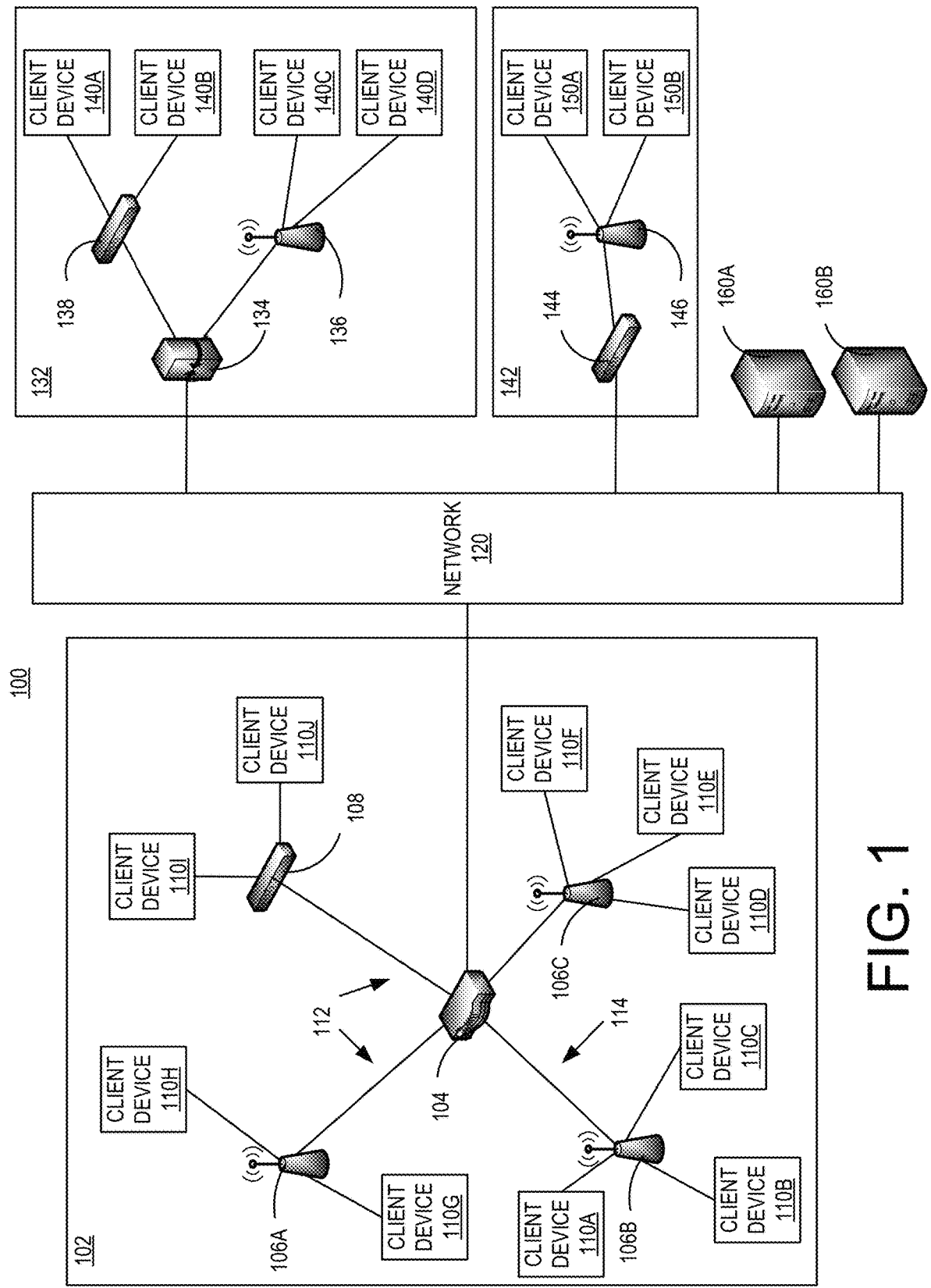
FIG. 1 illustrates an example networking environment in which the disclosed ZTP for trunk/LACP ports may be implemented.

The figures are not intended to be exhaustive or to limit various embodiments to the precise form disclosed. It should be understood that various embodiments can be practiced with modification and alteration.

DETAILED DESCRIPTION

The systems and techniques disclosed herein are directed to methods and systems which allow for "zero-touch" provisioning (ZTP) technology to be used to seamlessly bring up devices such as Gateways/Access Points/Switches or any other networking devices connected over different uplink types such as aggregated links (Static LAG, LACP), trunk ports, and the like. Currently, ZTP can be easily applied to ports that are commonly used in network environments, such as access ports (acting as uplink ports) on gateways and switches. However, in current deployments, there is no solution that enables ZTP to bring up devices such as Gateways/Access Points/Switches or any other networking devices connected over different uplink types such as aggregated links (Static LAG, LACP), and trunk ports in the same straightforward and effortless manner. Accordingly, the techniques disclosed herein are distinctly configured to adapt ZTP for specifically provisioning trunk ports and Link Aggregation Control Protocol (LACP) ports in order to maintain the automation and optimization benefits typically provided by ZTP.

For example, in a software defined wide area network (SD-WAN) networking environment, ZTP is often a key method for provisioning network devices, such as gateways as well as virtual private network concentrators (VPNCs). Bringing up these network devices using ZTP works seamlessly in scenarios where an uplink port on a gateway or VPNC is an access port. However, in scenarios where the uplink port is either a trunk port or a LACP/Static Lag in access or trunk mode, integrating ZTP may require a more brute force approach including: 1) manual set-up of the device; and 2) device pre-provisioning. For instance, when attempting to apply ZTP to bring up a trunk port, it may still require a network administrator to manually configure the network device using a setup dialogue. Even further, this manual configuration requires the network administrator to physically access the device console.

Alternatively, in the other brute force approach, a network administrator may be required to pre-provision the network device with ZTP over an access port in a local setup. Subsequently, the desired trunk and/or LACP configuration can be pushed, from Network Management Service (e.g., Aruba Central) for example, to the network device. Once the network device receives the proper configuration, the device can then be sent out for deployment (e.g., unplugged and sent to the branch location where it needs to be deployed). Although use of ZTP can be achieved in both of the aforementioned approaches, the manual set-up and pre-provisioning that are required in order for ZTP to properly integrate with trunk and/or LACP ports is less optimal and ultimately defeats the automatic configuring features provided by ZTP. Furthermore, the drawbacks of these brute force approaches are magnified for large scale networking environments, such as large SD-WAN deployments that can include branch sites in the thousand's. In such large scale deployments, having to manually configure or pre-provision each network device can be a substantially time-consuming task for a network administrator to the point where employing ZTP for bringing up trunk and/or LACP ports (using a brute force approach) is not a viably scalable solution.

In order to address these issues, the disclosed techniques adapt the provisioning process with ZTP to be specifically used for trunk and/or LACP ports. By leveraging DHCP vendor extensions (e.g., option 60 and option 43) and defining Vendor Class identifiers (VCIs), the disclosed techniques allow ZTP to bring up devices such as Gateways/Switches/Access Points or any other networking devices connected over Static Lag, LACP and/or trunk ports as efficiently and seamlessly as other ports. Consequently, the disclosed embodiments realize an automated and efficient solution that eliminates the need for manually provisioning or pre-provisioning Trunk and/or LACP ports. This automation is achieved by: 1) configuring option codes to be particularly applicable to Trunk and/or LACP ports; 2) consuming those option code during a ZTP phase; 3) programming a networking device (e.g., branch gateway) with the correct configuration for trunk and/or LACP ports as indicated by DHCP server; and 4) restarting ZTP to use the configured trunk and/or LACP ports. Furthermore, the disclosed techniques are agnostic with respect to the deployment configuration, and can be successfully employed to bring up trunk and/or LACP ports over a wide range of deployment models.

Before describing embodiments of the disclosed ZTP for trunk and/or LACP systems and methods in detail, it is useful to describe an example network installation with which these systems and methods might be implemented in various applications. FIG. 1 illustrates one example of a network configuration 100 that can employ the ZTP over trunk and/or LACP ports techniques, as disclosed. The network configuration 100 may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

In the example deployment shown in FIG. 1, switch 108 is configured to use a link aggregation mechanism, such as trunk ports and/or LACP ports. As referred to herein link aggregation refers to various methods of combining, or aggregating, multiple network connections in parallel. For example, switch 138 can aggregate multiple links for uplink communication to an external network, for example a network at remote site 132 including gateway device 134, in order to increase throughput beyond what a single connection could sustain, and to provide redundancy in case one of the links should fail.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site 102 may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point. According to the embodiments, the controller 104 can enable switches that include trunk and/or LACP ports, such as switch 108, to be provisioned using ZTP.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

As illustrated, switch 108 includes a port 170. In the illustrated example, port 170 can be particularly configured as a trunk port having the ability to communicate traffic for more than one VLAN over its aggregated links. As a trunk port, port 170 can support up to eight physical links that are assigned to one logical link (trunk) that functions as a single, higher-speed link providing dramatically increased bandwidth. This capability applies to connections between backbone devices as well as to connections in other network areas where traffic bottlenecks exist. Further, port 170 may be configured as part of a trunk group on the switch 108, where a set of up to eight ports (including port 170) can be configured as members of the same port trunk. In some cases, the ports in a trunk group do not have to be consecutive. Configuring port 170 as a trunk port may be advantageous, as the port's 170 aggregated links allow for traffic to be communicated for a group of VLANs, using the single port 170. According to the embodiments, switch 108 may be automatically provisioned using ZTP in manner that allows the port 170 to also be automatically configured, particularly as a trunk port that is able to direct traffic on a first VLAN at site 102, a second VLAN at remote site 132, and a third VLAN at remote site 142.

Referring to the client devices 110a-j in the network configuration 100, examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public wide area network (WAN), such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

In LACP, which refers to another port type (in addition to trunk ports illustrated in FIG. 1) that is supported by the embodiments, the protocol provides a standardized means for exchanging information, with partner systems, to form a link aggregation group (LAG). Generally, LACP can be employed as a standard to avoid port channel misconfiguration. For example, two devices (actor and partner) can exchange LACP data units (DUs) in the process of forming a LAG. A LAG is a collection of physical ports combined together. Umbrella terms used to describe link aggregation include trunking, bundling, boding, channeling, or teaming. These umbrella terms encompass not only industry standard protocols, such as LACP, but also various proprietary solutions.

In accordance with LACP, once multiple ports in the system have the same actor system ID, actor key, partner system ID, and partner key, they belong to the same LAG. In some implementations, a maximum number of port-channels that can be supported via LACP is eight. Also, LAGs can be created either statically or dynamically via LACP. As disclosed herein, provisioning techniques are specifically adapted to enable ZTP to be used to bring up devices using LACP ports. Although the embodiments are described particularly in reference to trunk and/or LACP ports, it should be appreciated that the disclosure is not intended to be limiting. Accordingly, the disclosed systems and methods can be applied to enable ZTP for ports supporting other link aggregation mechanisms.

Figure 2:
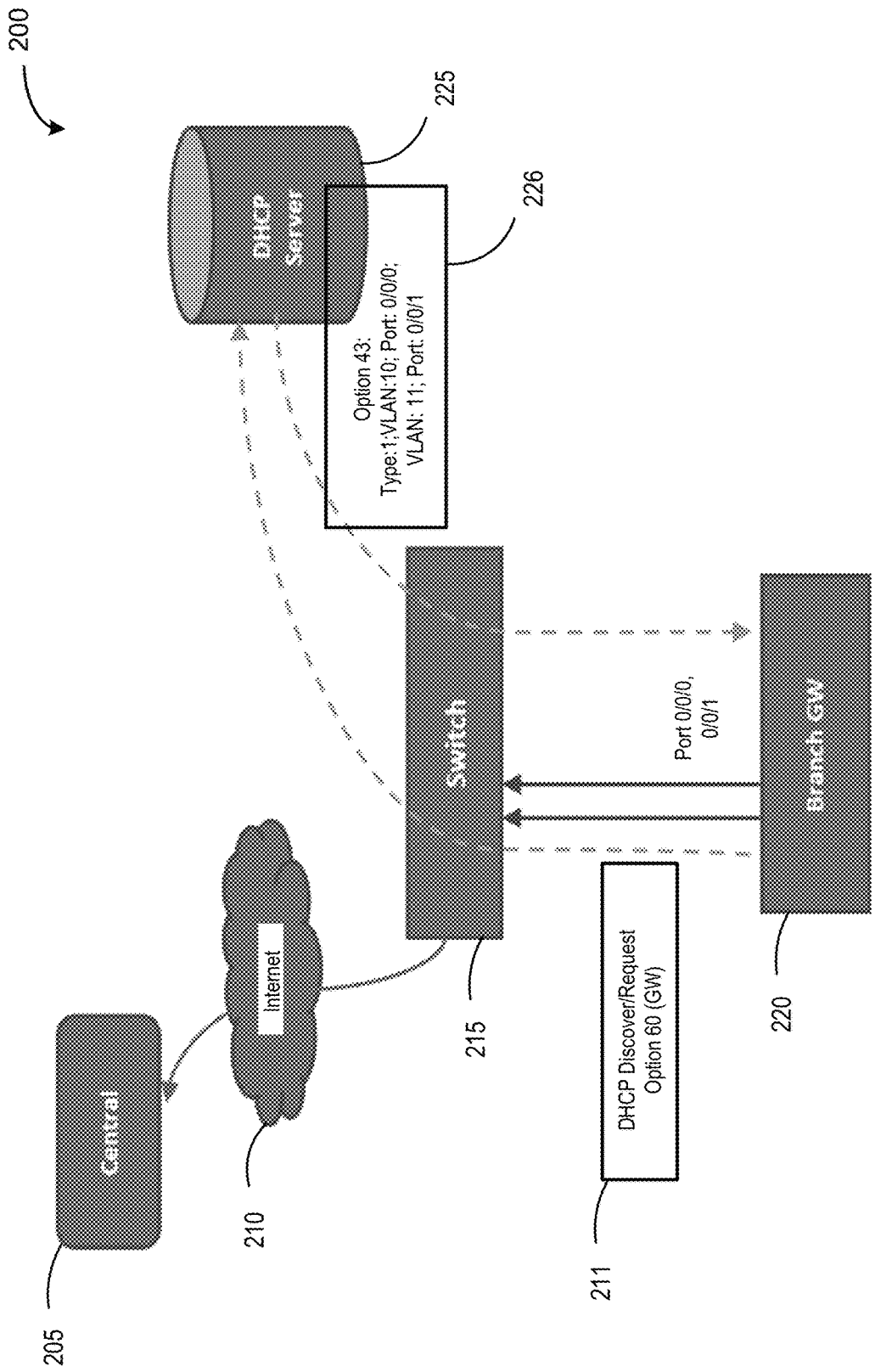
FIG. 2 illustrates an example system for implementing the disclosed ZTP for trunk ports in a networking environment, in accordance with the disclosure.

FIG. 2 is an example of a networking environment 200 implementing the disclosed techniques to enable ZTP for bringing up devices over trunk ports. In the example, the networking environment 200 can include a Virtual Local Area Network (VLAN) having a topology that includes a branch gateway 225, and a cloud service shown as a cloud-based network manager 205, and a DHCP server 225 that are communicatively connected by the communication network 210. In the example, the branch gateway 220 may be deployed at a location, such as a branch office, with a switch 215 that enables communication to other network devices that are remotely distributed from the location of the branch gateway 220 and the switch 215. For instance, the branch gateway 220 is communicatively connected to a DHCP server 225 via a switch 215. Further, the branch gateway 220 is communicatively connected to the communications network 210, shown as a WAN (e.g., Internet), via the switch 215. Also, the switch 215 is communicatively connected to the network manager 205 that may be remotely located from the switch 215 and branch gateway 220. As a general description, the network manager 205 can be server of a cloud-based service that provides unified network management for wired, wireless, and SD-WAN deployment, and support various management tasks, such as ZTP. In this example, the branch gateway 220 is implemented to include uplink ports 0/0/0, 0/0/1 which are Trunk Port with VLANS 10,11.

ZTP is a feature implemented by network devices, such as switches, that allows the devices to be provisioned and configured automatically, eliminating most of the manual labor involved with adding them to a network. ZTP allows the hardware to be installed directly into the environment and for that act to be the last hands-on moment. When the hardware is powered on (after deployment), the network device sends out a request through DHCP (Dynamic Host Configuration Protocol) or TFTP (Trivial File Transfer Protocol) to get the location of its centrally stored image and configuration, which it downloads and runs. Thereafter, ZTP automates steps like updating operating systems, deploying patches and bug fixes, and implementing added features prior to connecting the network device to the network. The tool carries out basic configuration, after which the switch can be deployed in an environment where custom configuration changes are made. Through a user provided script, ZTP can connect to a configuration management platform where custom configuration changes are made.

Network switches are often still configured one at a time through a command line interface, which has to be done a single system or switch at a time. In data centers, which might have tens or hundreds of switches to be provisioned and configured, that process is time-consuming. Each automated step compounds in saved time across innumerable systems. This advance in networking automation helps to optimize provisioning in step with similar improvements in server technologies.

According to the embodiments, the provisioning process is adapted to use pre-defined extensions and defined Vendor Class identifiers (VCIs) in a manner that allows ZTP to be employed while mitigating the need to manually configure or pre-provision the branch gateway 220. These pre-defined extensions can be implemented as DHCP vendor extensions option 60 and option 43. For any trunk port, native VLAN is a part of the trunk port configuration. This native VLAN is leveraged in the disclosed techniques, in order to contact the DHCP server 225 and obtain all the information required to discover associated uplink trunk information, as well as information that indicates whether the uplink port is a LACP port.

In the illustrated example, the branch gateway 220 transmits a DHCP discover message 211 (or a DHCP request message) to the DHCP server 225. As seen, the DHCP discover message 211 includes option 60. Option 60 is a code that is part of the DHCP standard. According to the standard, option 60 is used by DHCP clients in order to identify itself to the DHCP server. Here, option 60 is used by the branch gateway 220 as a mechanism to inform the DHCP server 225 that uplink details are being requested. A VCI for option 60 can be defined. In the illustrated example, the VCI for option 60 is defined as "ArubaGw." In response to receiving the DHCP discover message 211, the DHCP server 225 can check the VCI to determine whether the option 60 matches the VCI defined on the DHCP server 225. If there is a match between the VCI of the received option (i.e., option 60 and VCI ArubaGw) and the VCI on the DHCP server 225, the DHCP server 225 will return a return message 226 including an option 43. In the embodiments, the return message 226 is particularly configured to include the configuration information needed to bring up the branch gateway 220, and further uses option 43 to convey information that specifically indicates the type of uplink ports on the branch gateway 225. Option 43 is a code that is part of DHCP standard. According to the standard, when the DHCP server sees a recognizable VCI in a DHCP discover from a DHCP client, it returns the mapped vendor specific information in its DHCP offer to the client as option 43. In the embodiments, option 43 is distinctly configured to include a "type" indication, where the "type" indicates the type of ports that are implemented on the corresponding device. The "type" indication can be set to a value, where the value can be defined to indicate the type of port. As an example, the values used to implement the "type" indication can be defined as:

Type=1, Trunk port only
Type=2, Trunk and LACP
Type=3, Trunk and Static Lag
Type=4, Access port and LACP
Type=5, Access Port and Static Lag Referring back to the example of FIG. 2, the return message 226 including option 43 can include "Type: 1; VLAN:10; Port: 0/0/0; VLAN: 11; Port 0/0/1." Accordingly, option 43 having a "type" that is set to a value of "1" indicates that the branch gateway 220 includes trunk ports only. By analyzing the return message 226 including option 43, the branch gateway 220 has the information needed to determine the configuration and port type to be brought up with ZTP. In response to the branch gateway 220 receiving the response message 226 including option 43 from DHCP server 225, the branch gateway 220 will process the VCI and can program its port as trunk ports, as indicated by the option 43. The branch gateway 220 can communicate this information as part of setup configuration to the network manager 205. Thereafter, network manager 205 can push this information back to branch gateway 220 as part of full configuration sync via ZTP. Ultimately, ZTP can be achieved in the network environment 200 by adapting the option 60 and option 43 to communicate the information needed for the port type in an automated in seamless manner.

In another example, the branch gateway 220 may be implemented to include uplink ports 0/0/0, 0/0/1 to include both Trunk ports and Static Lag ports with VLANS 10,11. Thus, in this example, the option 43 included in a response message can be configured to have the "type" parameter set to the value "3", indicating that the branch gateway 220 will be configured to bring up trunk ports and Static Lag ports. As alluded to above, employing Static LAG allows multiple physical links between two end-points to be treated as a single logical link. For instance, setting uplink ports 0/0/0 as Static Lag may be beneficial if the physical links corresponding to those ports operate in full-duplex mode at the same speed, which is optimal to be configured as a LAG in order to increase bandwidth and redundancy. Referring back to the example of FIG. 2, the return message 226 including option 43 can include "Type: 3; VLAN:10; Port: 0/0/0; VLAN: 11; Port 0/0/1."

In yet another example, the branch gateway 220 may be implemented to have uplink ports 0/0/0, 0/0/1, these ports including access ports and LACP ports with VLANS 10,11. Thus, in the example, the option 43 in a response message can be configured having its "type" parameter set to the value "4", which indicates that the branch gateway 220 includes access ports and LACP ports. The return message 226, in this scenario, can include option 43 configured as "Type: 4; VLAN:10; Port: 0/0/0; VLAN: 11; Port 0/0/1."

In yet another example, the branch gateway 220 may be implemented to include uplink ports 0/0/0, 0/0/1, where the ports include both access ports and Static Lag ports with VLANS 10,11. In this scenario, the option 43 included in a response message can be configured to include the "type" set to the value "5", which indicates that the branch gateway 220 includes access ports and Static Lag ports. For example, the return message 226 can include option 43 configured as "Type: 5; VLAN:10; Port: 0/0/0; VLAN: 11; Port 0/0/1."

Figure 3:
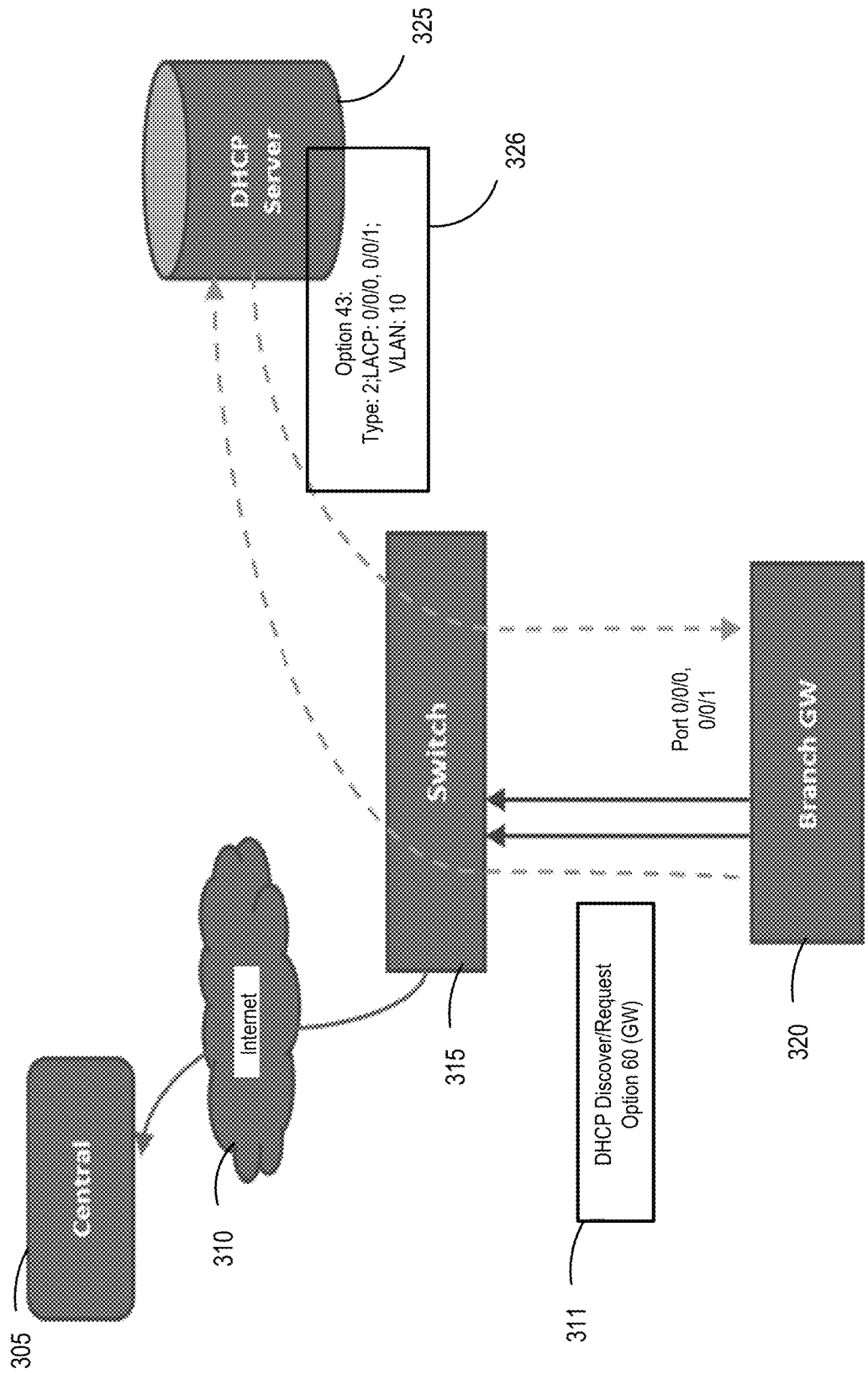
FIG. 3 illustrates an example system for implementing the disclosed ZTP for LACP ports in a networking environment, in accordance with the disclosure.

Referring to FIG. 3, another example of a networking environment 300 implementing the disclosed techniques to enable ZTP is shown. The example networking environment 300 in FIG. 3 includes substantially similar elements and functions as described in detail above in reference to the networking environment of FIG. 2. Thus, specifics regarding the topology and its elements of networking environment 300 are not described again in detail. However, the branch gateway 320 is implemented to include uplink ports 0/0/0, 0/0/1 which are LACP ports and part of a trunk configuration for VLAN 10. Thus, the techniques in the networking environment 300 are particularly implemented to enable ZTP for bringing up LACP ports.

As the branch gateway 320 has a different configuration (as compared to the branch gateway in FIG. 2), the return message 326 including option 43 has information that is specific to this deployment. As seen in FIG. 3, the return message 326 includes "Type: 2; LACP: 0/0/1, 0/0/1; VLAN: 10." Accordingly, option 43 having a "type" that is set to a value of "2" indicates that the branch gateway 320 includes trunk ports and LACP ports. By analyzing the return message 326 including option 43, the branch gateway 320 has the information needed to determine the configuration and port type to be brought up with ZTP. In response to the branch gateway 320 receiving the response message 326 including option 43 from DHCP server 325, the branch gateway 320 will process the VCI and can program its port as LACP ports and trunk ports, as indicated by the option 43. The branch gateway 320 can communicate this information as part of setup configuration to the network manager 305. Thereafter, network manager 305 can push this information back to branch gateway 320 as part of full configuration sync via ZTP.

Figure 4:
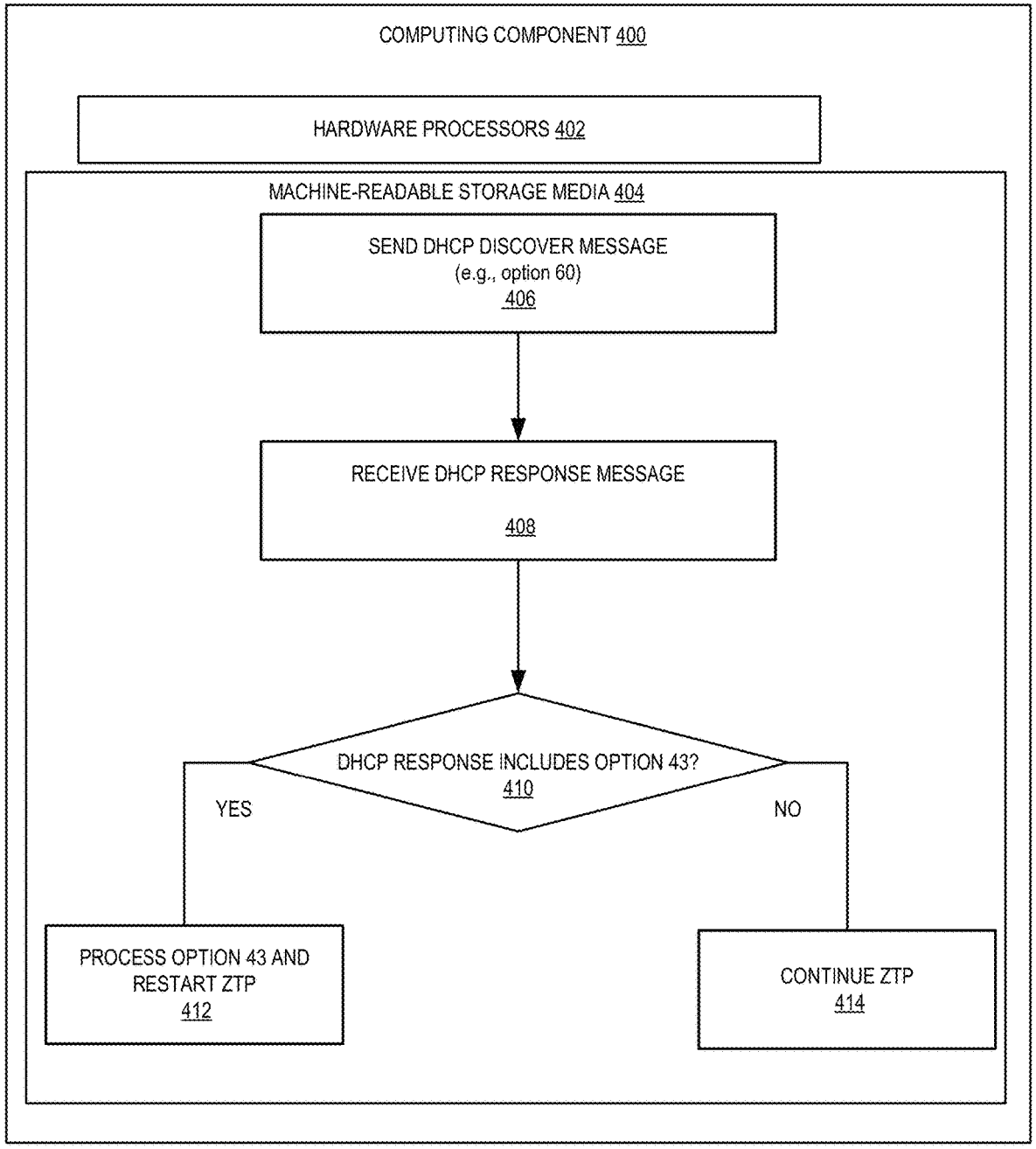
FIG. 4 is an operational flow diagram illustrating an example method for implementing the disclosed ZTP for trunk and/or LACP ports, in accordance with implementations of the disclosure.

FIG. 4 illustrates a flow chart of a process 400 for implementing the disclosed ZTP for trunk and/or LACP ports techniques. Furthermore, FIG. 4 shows process 400 as a series of executable operations stored on a machine-readable storage medium 404 performed by hardware processors 402, which can be the main processor of a computing component 400. For example, the computing component 400 can be a network device, such as a gateway described at least in reference to FIG. 2 and FIG. 3. In operation, hardware processors 402 execute the operations of process 400, thereby implementing the disclosed techniques.

In the example, the process 400 begins at operation 406 where a discover message is sent to a server. According to some embodiments, the server is a DHCP server and the discover message is a DHCP discover message. It should be appreciated that the embodiments are not limited to the use of a DHCP server, and can be implemented using other types of servers used for configuring network devices and discover messages. The network device may initially assume that its uplink ports are access ports. In other words, the network device, prior to receiving specific information from the DHCP server, may assume that each of its ports has a port type of "access port". Accordingly, the network device sends the DHCP request on its uplink port. According to the embodiments, the DHCP discover message includes pre-defined extensions and defines a VCI. Particularly, the pre-defined extensions can be implemented as DHCP vendor extensions option 60.

In instances where an uplink switch serves as an intermediary between the network device (e.g., branch gateway) and an external network, operation 406 can involve using the uplink switch (in addition to the initial network device) to forward the DHCP request to the remotely located DHCP server. In this scenario, operation 406 can involve the uplink switch (e.g., switch supporting uplink traffic from the branch gateway) initially receiving the DHCP discover message from the network device and considering the DHCP discover message as being received on a Native VLAN, as there is no VLAN tag information. Thus, the uplink switch will relay this DHCP discover message to the DHCP server.

In response to the DHCP server receiving the DHCP discover message in operation 406, the DHCP server can inspect the received DHCP discover message. Particularly, the DHCP server can inspect if the DHCP message includes an option 60. If there is an option 60, the DHCP server can further analyze the message to determine whether a VCI in the received DHCP discover message matches a VCI configured at the DHCP server. If there is a match between the VCIs, the DHCP server will respond with a response message including an option 43. In other words, the DHCP server can generate a response message (based on the DHCP discover message) that is communicated back to the network device. According to the embodiments, the response message includes pre-defined extensions. Particularly, the pre-defined extensions can be implemented as DHCP vendor extension option 43 and a virtual local area network (VLAN) configuration. Subsequently, operation 408 involves the network device receiving the response message including option 43, as sent from the DHCP server. As described in detail above, option 43 can include a "type" indication that is set to a particular value by the DHCP server. According to the embodiments, the values used to implement the "type" indication can be defined as:

Type=1, Trunk port only
Type=2, Trunk and LACP
Type=3, Trunk and Static Lag
Type=4, Access port and LACP
Type=5, Access Port and Static Lag As the response message including option 43 includes information that is specific to the particular deployment and the network device being provisioned, there are various different configurations for the response message that may be received by the network device in operation 408. In an example deployment, the network device is a gateway having an uplink port implemented as static LAG ports 0,1, and part of trunk vlan10, and having no Native VLAN 5. In this example, in order to indicate the aforementioned configuration for the unlink port, the option 43 may be configured as:

Option 43: Type:3; SLAG:0/0/1,0/0/2; VLAN:10

As alluded to above, the values of the option 43 can have a plurality of different combinations depending on the deployment. Thus, the disclosed embodiments provide a solution that is agnostic to the specific deployment used, and has the flexibility to be applied across a wide range of deployments.

Thereafter, in response to receiving the response message including option 43, the process 400 can continue to operation 410. At operation 410, the network device can inspect the response message from the DHCP server to perform a check to determine whether an option 43 is indeed included in the message.

In the case where there is an option 43 detected (shown as "yes" in FIG. 4) the process 400 continues to operation 412. At operation 412 the network device can process the information conveyed by option 43 and ultimately restart ZTP in a manner that brings up the device's ports even if they are trunk and/or LACP ports. Operation 412 can include the network device performing configuration automatically as per the option 43 information. That is, the network device can configure its ports based on the information conveyed by option 43. The network device can start DHCP discovery on these configured ports to restart ZTP. For example, when a gateway receives option 43, it can process the VCI and program its ports as indicated by the "type." For example, if the "type" indication is set to the value of "2", the gateway will program its ports as a trunk port and a LACP port correspondingly in operation 412. Furthermore, operation 412 can involve the network device sending this configuration information as part of setup configuration back to a cloud-based service. The cloud-based service can then push this info back to the gateway as part of full configuration synchronization.

Referring back to operation 410, alternatively if the check determines that an option 43 is not detected (shown as "no" in FIG. 4) in the response message, then the process 400 continues to operation 414. If there is no option 43 information, then the network device does not have the information necessary to bring up its own ports and configure itself. As a result, at operation 410, the network device has to continue with conventional ZTP, where it may be required to contact a provisioning server.

Figure 5:
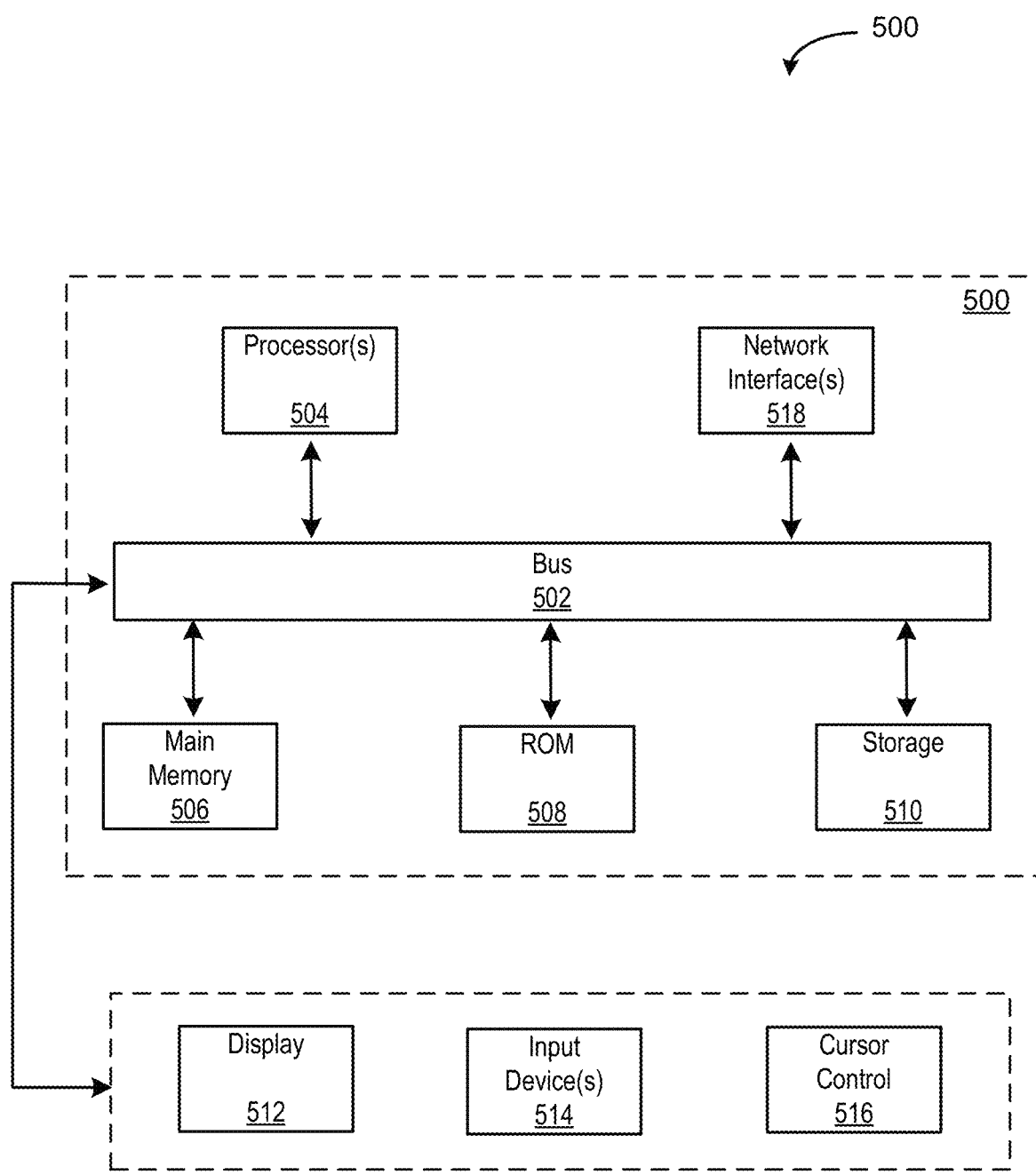
FIG. 5 is a block diagram of an example computing component or device for implementing the disclosed ZTP for trunk and/or LACP ports techniques, in accordance with one embodiment.

FIG. 5 depicts a block diagram of an example computer system 500 in which the ZTP for trunk and/or LACP ports as disclosed herein may be implemented. For example, the computer system 500 may be a networking device, such as a branch gateway (shown in FIG. 2 and FIG. 3), as described in detail above. The computer system 500 includes a fabric 502 or other communication mechanism for communicating information, one or more hardware processors 404 coupled with fabric 502 for processing information. Hardware processor(s) 504 may be, for example, one or more general purpose microprocessors.

The computer system 500 also includes a main memory 506, such as a random-access memory (RAM), cache and/or other dynamic storage devices, coupled to fabric 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes storage devices 510 such as a read only memory (ROM) or other static storage device coupled to fabric 502 for storing static information and instructions for processor 504. A storage device 510, such as a magnetic disk, optical disk, or USB thumb drive (Flash drive), etc., is provided and coupled to fabric 502 for storing information and instructions.

The computer system 500 may be coupled via fabric 502 to a display 512, such as a liquid crystal display (LCD) (or touch screen), for displaying information to a computer user. An input device 514, including alphanumeric and other keys, is coupled to fabric 502 for communicating information and command selections to processor 504. Another type of user input device is cursor control 416, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 406. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
receiving, by a Dynamic Host Configuration Protocol (DHCP) server, a DHCP discover message from an uplink port of a gateway, wherein the DHCP discover message is transmitted by the gateway and comprises a vendor class identifier (VCI);
in response to receiving the DHCP discover message, determining that the DHCP discover message includes a first DHCP defined option code identifying a configured device;
in response to determining that the DHCP discover message includes the first DHCP defined option code, determining that the VCI in the DHCP discover message matches a VCI for the configured device; and
in response to determining the match between the VCI in the DHCP discover message and the VCI for the configured device, automatically transmitting configuration information for the configured device, the configuration information comprising a pre-defined extension and a virtual local area network (VLAN) configuration, wherein the pre-defined extension comprises a second DHCP defined option code to return mapped vendor specific information corresponding to the VCI for the configured device and identifies a port type such that the configuration information is automatically processed and the uplink port is programmed as a trunk port, or a Link Aggregation Control Protocol (LACP) port, or both the trunk port and the LACP port based on the port type identified by the pre-defined extension, and the uplink port is configured in accordance with the VLAN configuration, and wherein the port type identified by the pre-defined extension comprises a first type indicating a trunk port only, or a second type indicating an LACP port, or a third type indicating a trunk port and an LACP port.

2. The method of claim 1, wherein an uplink switch associates the DHCP discover message with a native VLAN and relays the DHCP discover message to the DHCP server.

3. The method of claim 1, further comprising:
receiving, by the gateway, the second DHCP defined option code;
processing, by the gateway, the VCI in the DHCP discover message;
automatically programming, by the gateway, the uplink port as the trunk port, or the LACP port, or both the trunk port and the LACP port based on the port type; and
applying, by the gateway, the programming as part of a setup configuration.

4. The method of claim 1, further comprises automatically deploying one or more devices in a network corresponding to the gateway.

5. The method of claim 4, wherein automatically deploying the one or more devices comprises performing Zero-Touch Provisioning (ZTP).

6. A method comprising:
transmitting, by a network device, a Dynamic Host Configuration Protocol (DHCP) discover message on an uplink port;
receiving, by the network device, a response message based on the DHCP discover message;
determining that a pre-defined extension is included in the response message, wherein the pre-defined extension indicates a port type and a virtual local area network (VLAN) configuration, and the pre-defined extension comprises a DHCP defined option code to return mapped vendor specific information, and wherein the port type indicated by the pre-defined extension comprises one of:
a first type indicating a trunk port only;
a second type indicating a Link Aggregation Control Protocol (LACP) port; or
a third type indicating a port trunk and an LACP port;
in response to determining that the pre-defined extension is included in the response message, automatically configuring one or more ports of the network device and a VLAN associated with the network device based on the port type and the VLAN configuration indicated by the pre-defined extension; and
restarting a zero-touch provisioning (ZTP) for the network device in accordance with the configuring of the one or more ports of the network device and the VLAN associated with the network device.

7. The method of claim 6, further comprising:
receiving, by the network device, the DHCP defined option code;
automatically programming, by the network device, the uplink port as the trunk port, the LACP port, or both the trunk port and the LACP port based on the port type; and
applying, by the network device, the programming as part of a setup configuration.

8. The method of claim 6, further comprising automatically deploying one or more devices in a network corresponding to the network device.

9. The method of claim 8, wherein automatically deploying the one or more devices comprises performing Zero-Touch Provisioning (ZTP).

10. A Dynamic Host Configuration Protocol (DHCP) server comprising:
a hardware processor; and
a non-transitory computer-readable storage medium storing instructions that, when executed by the hardware processor, cause the DHCP server to:
receive, at the DHCP server, a DHCP discover message from an uplink port of a gateway, wherein the DHCP discover message is transmitted by the gateway and comprises a vendor class identifier (VCI);
in response to receiving the DHCP discover message, determine whether the DHCP discover message includes a first DHCP defined option code identifying a configured device;
in response to determining that the DHCP discover message includes the DHCP defined option code, determine whether the VCI in the DHCP discover message matches a VCI for the configured device; and in response to determining a match between the VCI in the DHCP discover message and the VCI for the configured device, automatically transmitting configuration information for the configured device, the configuration information comprising a pre-defined extension and a virtual local area network (VLAN) configuration, wherein the pre-defined extension comprises a second DHCP defined option code to return mapped vendor specific information corresponding to the VCI for the configured device and identifies a port type such that the configuration information is automatically processed and the uplink port is programmed as a trunk port, or a Link Aggregation Control Protocol (LACP) port, or both the trunk port and the LACP port based on the port type identified by the pre-defined extension, and the uplink port is configured in accordance with the VLAN configuration, and wherein the port type identified by the pre-defined extension comprises a first type indicating a trunk port only, or a second type indicating an LACP port, or a third type indicating a trunk port and an LACP port.

11. The DHCP server of claim 10, wherein the DHCP discover message is relayed by a switch.

12. A network device comprising:
a hardware processor; and
a non-transitory computer-readable storage medium storing instructions that, when executed by the hardware processor, cause the network device to:

transmit, from the network device, a Dynamic Host Configuration Protocol (DHCP) discover message on an uplink port;

receive, at the network device, a response message based on the DHCP discover message;

determine whether a pre-defined extension is included in the response message, wherein the pre-defined extension indicates a port type and a virtual local area network (VLAN) configuration, and the pre-defined extension comprises a DHCP defined option code to return mapped vendor specific information, and wherein the port type indicated by the pre-defined extension comprises at least one of:

a first type indicating a trunk port only;

a second type indicating a Link Aggregation Control Protocol (LACP) port; or a third type indicating a trunk and an LACP port;

in response to determining that the pre-defined extension is included in the response message, automatically configure one or more ports of the network device and a VLAN associated with the network device based on the port type and the VLAN configuration indicated by the pre-defined extension; and restart a zero-touch provisioning (ZTP) for the network device in accordance with the configuring of the one or more ports of the network device and the VLAN associated with the network device.

* * * * *